United States Patent
Sasaki et al.

(10) Patent No.: US 10,974,651 B2
(45) Date of Patent: Apr. 13, 2021

(54) VEHICLE

(71) Applicant: Toyota Jidosha Kabushiki Kaisha, Toyota (JP)

(72) Inventors: Akira Sasaki, Miyoshi (JP); Eisuke Ando, Nagoya (JP); Misako Hayashima, Okazaki (JP); Saki Kitoh, Okazaki (JP); Masahiro Yamashita, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 179 days.

(21) Appl. No.: 16/254,050

(22) Filed: Jan. 22, 2019

(65) Prior Publication Data
US 2019/0225156 A1    Jul. 25, 2019

(30) Foreign Application Priority Data
Jan. 24, 2018  (JP) .............................. JP2018-009973

(51) Int. Cl.
*B60R 1/12*  (2006.01)
*B60R 1/00*  (2006.01)
(Continued)

(52) U.S. Cl.
CPC .............. *B60R 1/12* (2013.01); *B60K 35/00* (2013.01); *B60Q 3/74* (2017.02); *B60Q 3/80* (2017.02);
(Continued)

(58) Field of Classification Search
CPC .. B60R 1/00; B60R 1/001; B60R 1/02; B60R 1/04; B60R 1/08; B60R 1/083; B60R 1/084; B60R 1/085; B60R 1/088; B60R 1/12; B60R 2001/1223; B60R 2001/1238; B60R 2001/1253; B60R 2001/1292; B60J 3/04; B60K 2370/152; B60K 2370/1526; B60K 2370/1529; B60K 2370/1531;
(Continued)

(56) References Cited

U.S. PATENT DOCUMENTS 6,281,804 B1    8/2001  Haller et al.
6,910,779 B2 *  6/2005  Abel .................... B60R 1/08
                                                        345/46
(Continued)

FOREIGN PATENT DOCUMENTS

JP    2006-131130 A    5/2006
JP    2007-203979 A    8/2007
(Continued)

*Primary Examiner* — Thomas G Black
*Assistant Examiner* — Sara J Lewandroski
(74) *Attorney, Agent, or Firm* — Dinsmore & Shohl LLP

(57) ABSTRACT

A vehicle is provided including an activation section, a shielding section, and a display section. An occupant uses the activation section to activate a make-up mode to assist the occupant in doing their make-up. The shielding section makes opaque at least one of a windshield glass, a side window glass, or a rear glass in a state in which the make-up mode has been activated. The display section is configured to display a mirror image of an entire face of the occupant in front of the occupant in a state in which the make-up mode has been activated, the mirror image being in an upright state relative to the occupant.

15 Claims, 8 Drawing Sheets

(51) Int. Cl.
*B60W 50/00* (2006.01)
*B60K 35/00* (2006.01)
*B60Q 3/74* (2017.01)
*B60R 11/02* (2006.01)
*B60Q 3/80* (2017.01)
*B60R 11/00* (2006.01)
*B60J 3/04* (2006.01)

(52) U.S. Cl.
CPC ............ *B60R 1/00* (2013.01); *B60R 11/0235* (2013.01); *B60W 50/0098* (2013.01); *B60J 3/04* (2013.01); *B60K 2370/1529* (2019.05); *B60K 2370/21* (2019.05); *B60K 2370/334* (2019.05); *B60K 2370/739* (2019.05); *B60R 2001/1215* (2013.01); *B60R 2001/1238* (2013.01); *B60R 2011/0026* (2013.01); *B60R 2300/8006* (2013.01)

(58) Field of Classification Search
CPC ....... B60K 2370/1533; G09G 2340/00; G09G 2340/0464; G09G 2340/0471; G09G 2340/0478; G09G 2340/0485; G09G 2340/0492; G09G 2340/14; B60Q 3/80; B60Q 3/82; B60Q 3/74; B60Q 3/76; B60W 50/0098
See application file for complete search history.

(56) References Cited

U.S. PATENT DOCUMENTS

| | | | |
|---|---|---|---|
| 2015/0054933 A1* | 2/2015 | Wasiek | B60R 1/00 348/77 |
| 2016/0114731 A1* | 4/2016 | Habibi | B60J 3/04 345/173 |
| 2019/0022981 A1* | 1/2019 | Labrot | B32B 17/10541 |
| 2019/0022984 A1* | 1/2019 | Labrot | B32B 17/10201 |
| 2019/0176660 A1* | 6/2019 | Xiao | B60R 11/0235 |

FOREIGN PATENT DOCUMENTS

| | | | | |
|---|---|---|---|---|
| WO | WO-2017065693 A1 * | 4/2017 | | E06B 9/24 |
| WO | 2017071911 A1 | 5/2017 | | |

* cited by examiner

VEHICLE

CROSS-REFERENCE TO RELATED APPLICATION

This application is based on and claims priority under 35 USC 119 from Japanese Patent Application No. 2018-009973 filed, on Jan. 24, 2018, the disclosure of which is incorporated by reference herein.

BACKGROUND

Technical Field

The present disclosure relates to a vehicle.

Related Art

Japanese Patent Application Laid-Open (JP-A) No. 2006-131130 discloses an disclosure relating to a vehicle sun visor. A make-up mirror and cabin interior illumination device are provided to a sun visor body of the vehicle sun visor. The make-up mirror faces toward the inside of the vehicle cabin in a state in which the sun visor body is in a light-blocking position. This enables an occupant to do their make-up while seeing their face reflected in the mirror in a state illuminated by the cabin interior illumination device.

However, in the above related art, the size of the make-up mirror is limited, and so the occupant is unable to see their entire face in the make-up prior mirror while doing their make-up. Moreover, in the above related art, the occupant can be seen doing their make-up from outside the vehicle, making it difficult to secure the privacy of the occupant. Namely, there is room for improvement in the above related art with regards to enabling an occupant to see their entire face while doing their make-up, while also securing occupant privacy.

SUMMARY

In consideration of the above circumstances, an object of the present disclosure is to obtain a vehicle enabling an occupant to see their entire face while doing their make-up, while securing occupant privacy.

A vehicle of a first aspect of the present disclosure includes an activation section, a shielding section, and a display section. An occupant uses the activation section to activate a make-up mode to assist the occupant in doing their make-up. The shielding section makes opaque at least one of a windshield glass, a side window glass, or a rear glass in a state in which the make-up mode has been activated. The display section is configured to display a mirror image of an entire face of the occupant in front of the occupant in a state in which the make-up mode has been activated, the mirror image being in an upright state relative to the occupant.

According to the vehicle of the first aspect of the present disclosure, the make-up mode to assist the occupant in doing their make-up is activated by the occupant using the activation section. In a state in which the make-up mode has been activated, the shielding section makes opaque at least one of the windshield glass, the side window glass, or the rear glass. This thereby enables the occupant to do their make-up in a state hidden from the gaze of passers-by and so on outside the vehicle by the shielding section in a state is which the make-up mode has been activated.

Moreover, in the present aspect, in a state in which the make-up mode has been activated, the display section is configured to display a mirror image of the entire face of the occupant in front of the occupant, the mirror image being in an upright state relative to the occupant. This enables, a state to be achieved that is similar to a state that would be achieved by disposing a mirror configured to reflect the entire face of the occupant in front of the occupant while the occupant is doing their make-up.

A vehicle of a second aspect of the present disclosure is the vehicle of the first aspect, further including an illumination section that shines an illuminating light on the occupant in a state in which the make-up mode has been activated.

According to the vehicle of the second aspect of the present disclosure, in a state in which the make-up mode has been activated, illuminating light is shone on the face of the occupant from the illumination section. This thereby enables the mirror image of the face of the occupant to be clearly displayed on the display section, even in cases in which the vehicle interior is dark.

A vehicle of a third aspect of the present disclosure is the vehicle of the second aspect, further including a destination acquisition section and an illumination adjustment section. The destination acquisition section acquires a destination of the vehicle. The illumination adjustment section adjusts the illuminating light based on the destination acquired by the destination, acquisition section in a state in which the make-up mode has been activated.

According to the vehicle of the third aspect of the present disclosure, the destination of the vehicle is acquired by the destination acquisition section. The illumination adjustment section adjusts the illuminating light shone from the illumination section based on the destination acquired by the destination acquisition section. For example, in cases in which the destination is a location with relatively dim interior lighting, such as an art gallery, adjustment is made by the illumination adjustment section such that a weak illuminating light is shone. The present aspect thereby enables the strength of the illuminating light shone on the face of the occupant to be made to correspond to the lighting at their destination.

A vehicle of a fourth aspect of the present disclosure is the vehicle of any one of the first aspect to the third aspect, further including a seatback pivoting section and a seatback pivot control section. The seatback pivoting section is configured to pivot a seatback of a seat in which the occupant sits. The seatback pivot control section drives the seatback pivoting section such that the seatback attains an erect state with respect to a seat cushion of the seat in a state in which the make-up mode has been activated.

According to the vehicle of the fourth aspect of the present disclosure, the seatback of the seat in which the occupant sits is configured to be pivoted by the seatback pivoting section. In a state in which the make-up mode has been activated, the seatback is set to an erect state with respect to the seat cushion by driving the seatback pivoting section using the seatback pivot control section. Thus, even if the back of the occupant leaning on the seatback is tilted with respect to the seat cushion prior to the make-up mode being activated, the back of the occupant can be placed in an erect state with respect to the seat cushion after the make-up mode has been activated.

A vehicle of a fifth aspect of the present disclosure is the vehicle of any one of the first aspect to the fourth aspect, wherein the shielding section is a light-control film that is provided along the windshield glass. Moreover, the display section is an organic EL display that is disposed at a vehicle cabin inner side of the light-control film and that is provided along a vehicle cabin inner side face of the windshield glass.

According to the vehicle of the fifth aspect of the present disclosure, in a state in which the make-up mode has been activated, the windshield glass is made opaque by the light-control film provided along the windshield glass. This thereby enables gazes and light from in front of the vehicle to be blocked in a state in which the make-up mode has been activated.

The organic EL display is disposed at the vehicle cabin inner side face of the light-control film, and the organic EL display is provided along the vehicle cabin inner side face of the windshield glass. In a state in which the make-up mode has been activated, the mirror image of the entire face of the occupant is displayed on the organic EL display in front of the occupant in an upright state relative to the occupant. This thereby enables the occupant to use the windshield glass as a mirror while doing their make-up.

A vehicle of a sixth aspect of the present disclosure is the vehicle of any one of the first aspect to the fourth aspect, wherein the shielding section is a light-control film that is provided along the windshield glass and that is configured to be adjusted such that its transmissivity is lowered as a speed of the vehicle decreases and its transmissivity is raised as the speed of the vehicle increases. Moreover, the display section is a display that is deployed in front of the occupant in a state in which the make-up mode has been activated.

According to the vehicle of the sixth aspect of the present disclosure, in a state in which the make-up mode has been activated, the display is deployed in front of the occupant, and a mirror image of the entire face of the occupant is displayed on the display in an upright state relative to the occupant. This thereby enables the occupant to use the display as a mirror white doing their make-up.

Moreover, in the present aspect, the light-control film is provided along the windshield glass. In a state in which the make-up mode has been activated, the transmissivity of the light-control film is lowered as the speed of the vehicle carrying the occupant decreases and is raised as the speed of the vehicle increases. This enables the occupant to do their make-up in a state hidden from the gaze of passers-by and so on outside the vehicle by the light-control film in a state in which the vehicle carrying the occupant is traveling at low speed, namely, in a state in which the vehicle interior can easily be seen from outside the vehicle. This also enables the occupant to do their make-up in a state in which the occupant is able to ascertain conditions outside the vehicle interior in a state in which the vehicle carrying the occupant is traveling at high speed, namely, in a state in which, the vehicle interior is difficult to see from outside the vehicle.

As described above, the vehicle of the first aspect of the present disclosure exhibits the excellent advantageous effect of enabling the occupant to do their make-up whilst seeing their entire face, while securing the privacy of the occupant.

The vehicle of the second aspect of the present disclosure exhibits the excellent advantageous effect of enabling the brightness inside the vehicle interior to be suppressed from having an effect on the make-up of the occupant.

The vehicle of the third aspect of the present disclosure exhibits the excellent advantageous effect of enabling make-up to be applied under similar lighting conditions to those at the destination of the vehicle.

The vehicle of the fourth aspect of the present disclosure exhibits the excellent advantageous effect of enabling the occupant to be assisted in easily maintaining a posture suitable for doing their make-up.

The vehicle of the fifth aspect of the present disclosure exhibits the excellent advantageous effect of enabling the configuration of the vehicle interior to be simplified compared to a configuration in which, for example, a separate mirror or head-up display for reflecting the face of the occupant is provided in front of the occupant.

The vehicle of the sixth aspect of the present disclosure exhibits the excellent advantageous effect of enabling the privacy of the occupant to be secured in a state in which the vehicle is moving at low speed, and enabling the occupant to easily ascertain the situation surrounding the vehicle in a state in which the vehicle is moving at high speed, in a state in which the occupant is doing their make-up.

BRIEF DESCRIPTION OF THE DRAWINGS

Exemplary embodiments of the present disclosure will be described in detail based on the following figures, wherein.

DETAILED DESCRIPTION

First Exemplary Embodiment

Explanation follows regarding a first exemplary embodiment of a vehicle interior member according to the present disclosure, with reference to FIG. 1 to FIG. 5. Note that in each of the drawings, the arrow FR indicates the vehicle front, the arrow UP indicates the vehicle upper side, and the arrow OUT indicates a vehicle width direction outer side, as appropriate.

Figure 5:
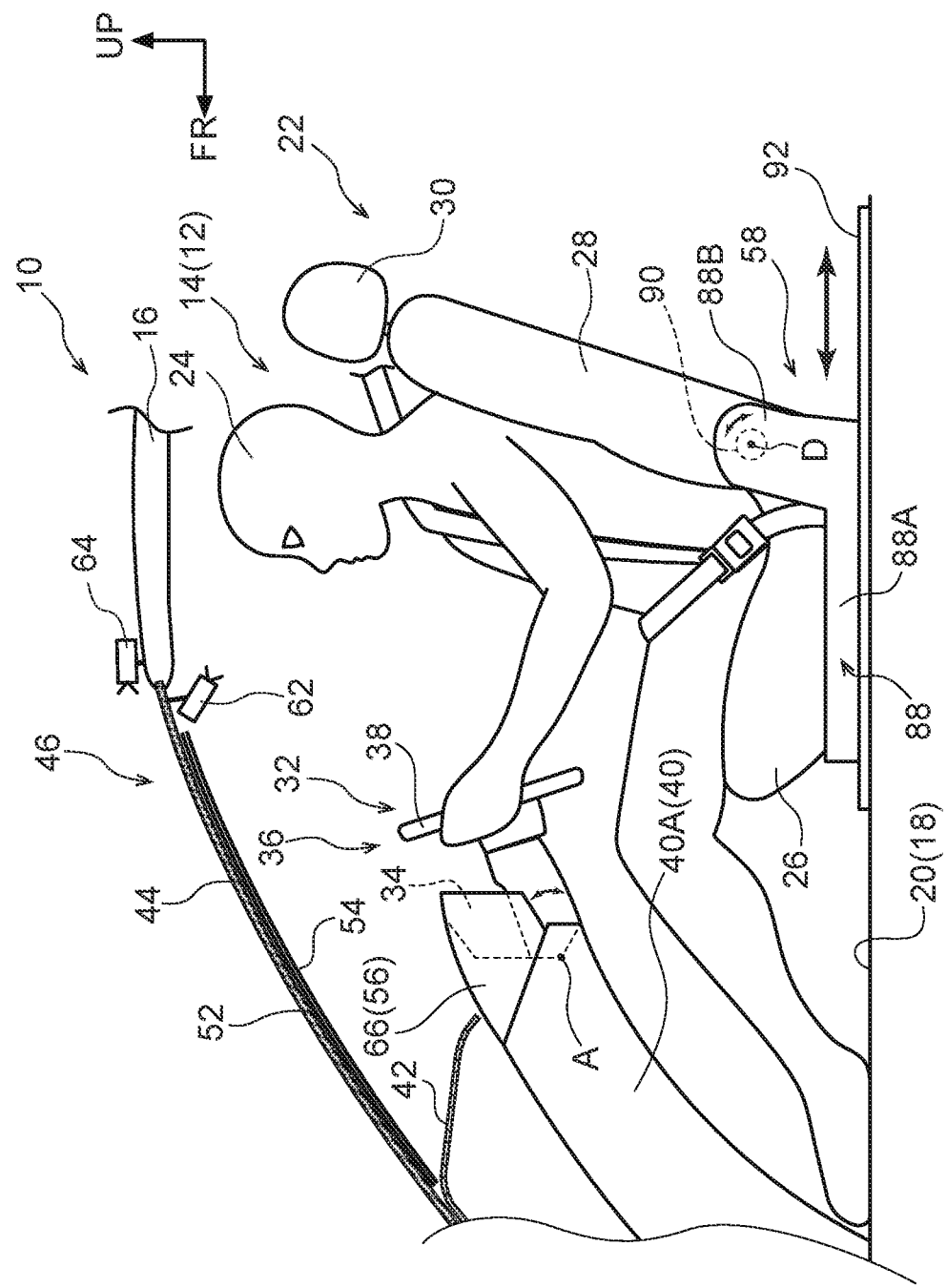
FIG. 5 is a side view schematically illustrating a configuration of a vehicle according to the first exemplary embodiment.

First, explanation follows regarding a schematic configuration of a vehicle 10 according to the present exemplary embodiment, with reference to FIG. 5. A cabin 14 configures a main section of a vehicle interior 12 of the vehicle 10. A roof 16 configures a vehicle upper section of the cabin 14, and a floor 18 configures a vehicle lower section of the cabin 14.

The floor 18 is configured including a floor panel 20 extending along the vehicle front-rear direction and the vehicle width direction. A seat 22 is disposed at a vehicle width direction right-hand section of the floor panel 20 at the vehicle front side of the floor panel 20. Namely, the vehicle 10 is a right-hand drive vehicle in the present exemplary embodiment.

The seat 22 is configured including a seat cushion 26 on which an occupant 24 sits, a seatback 28 that supports the back of the occupant 24, and a headrest 30 that supports the head of the occupant 24. As described later, a lower end of the seatback 28 is configured to pivot with respect to a rear end of the seat cushion 26. Note that an airbag that is configured to restrain the head of the occupant 24 in a collision of the vehicle 10 or the like is built into the headrest 30.

A front unit 36 configured including a steering unit 32 and an instrumentation unit 34 is disposed in front of the seat 22. The steering unit 32 includes a steering wheel 38 that is gripped by the occupant 24, and a steering resistance force actuator, not illustrated in the drawings. The steering resistance force actuator is configured to transmit steering resistance force to the steering wheel 38, and is electrically connected to a non-illustrated steering actuator so as to be configured to drive the steering actuator according to a steering angle of the steering wheel 38 in order to turn the steering wheel of the vehicle 10. Namely, the vehicle 10 employs a steer-by-wire steering system.

Figure 2:
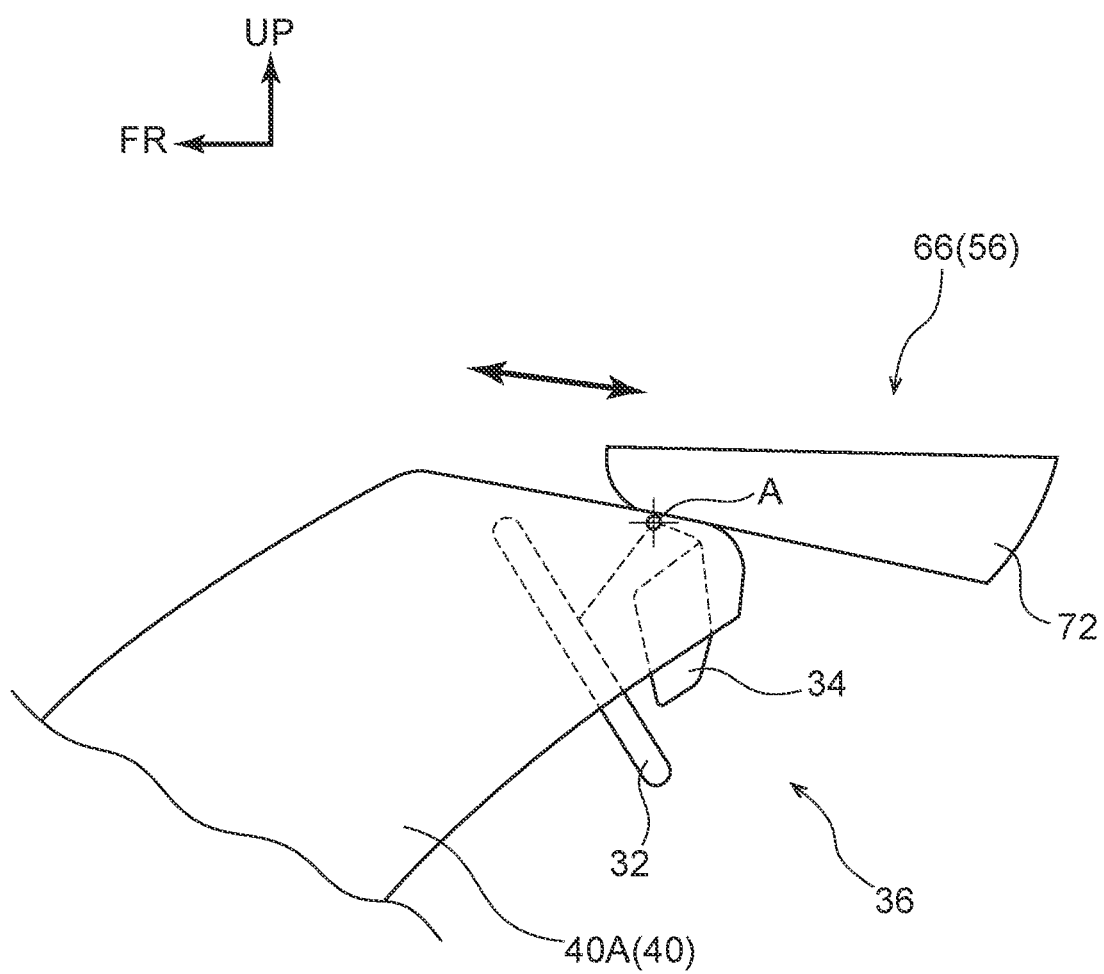
FIG. 2 is a side view illustrating a configuration surrounding a steering wheel of a vehicle according to the first exemplary embodiment, to illustrate a state surrounding the steering wheel in a state in which a make-up mode has been activated.

As is also illustrated in FIG. 2, the instrumentation unit 34 is integrally provided to the steering unit 32 and includes a display screen, not illustrated in the drawings. The speed and so on of the vehicle 10 can be displayed on the display screen. Note that the instrumentation unit 34 is electrically connected to a speedometer 106 (referred to in the second exemplary embodiment described later) and the like.

The front unit 36 configured as described above is attached to a support section 40 extending from the floor panel 20 toward the vehicle upper side. The support section 40 is configured including a pair of plate shaped side skirt sections 40A that extend from the vehicle lower front side toward the vehicle upper rear side with their plate thickness direction in the vehicle width direction. The side skirt sections 40A are disposed spaced apart from each other in the vehicle width direction, this spacing widening on progression toward the vehicle lower side. With the exception of at a vehicle rear portion, vehicle upper ends of the side skirt sections 40A are linked together by a non-illustrated top plate configuring part of the support section 40.

The front unit 36 includes a non-illustrated actuator, and is coupled to the portion of the support section 40 that is further toward the vehicle rear than the top plate. The front unit 36 is configured to pivot with respect to the support section 40 about a pivot axis A extending in the vehicle width direction by being driven by the actuator. In a state in which the front unit 36 has pivoted clockwise about the pivot axis A, the majority of the front unit 36 is contained between the side skirt sections 40A, namely, within the support section 40. Note that the majority of the support section 40 is covered from the vehicle upper side by an instrument panel 42 extending in the vehicle width direction and vehicle front-rear direction.

A windshield glass 44 is disposed at the vehicle front of the cabin 14 (in front of the seat 22). The windshield glass 44 is configured by a transparent glass sheet. As viewed along the vehicle width direction, the windshield glass 44 extends downward and toward the vehicle front from a vehicle front peripheral edge of the roof 16, and a central section of the windshield glass 44 is curved such that the windshield glass 44 bulges out toward the vehicle front.

Figure 3:
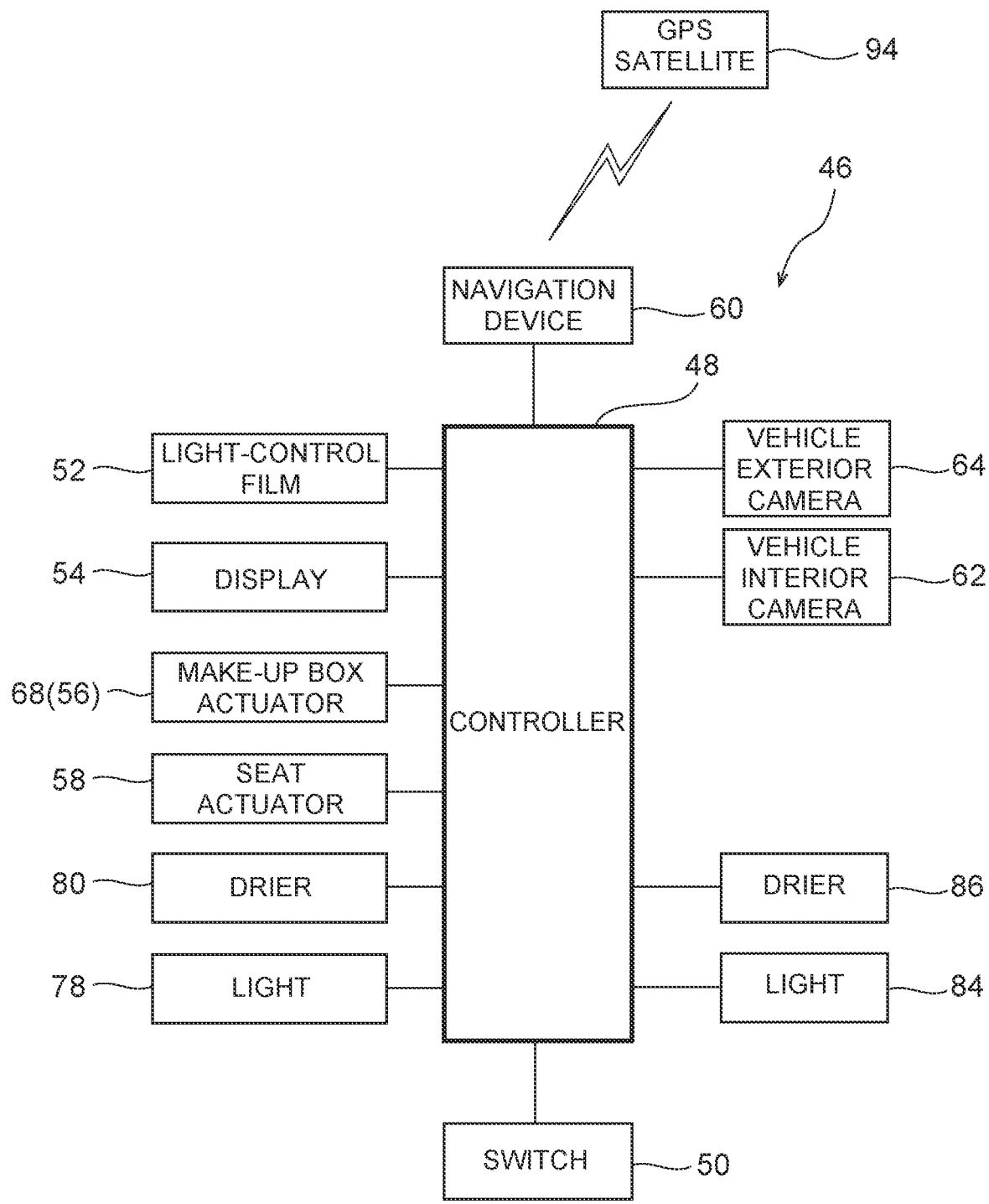
FIG. 3 is a block diagram illustrating an outline configuration of a make-up assistance device according to the first exemplary embodiment.

Note that as illustrated in FIG. 3, a feature of the present exemplary embodiment is that the vehicle 10 includes a make-up assistance device 46. The make-up assistance device 46 can assist the occupant 24 with their make-up. Detailed explanation follows regarding configuration of the make-up assistance device 46 configuring a relevant portion of the present exemplary embodiment.

Figure 1:
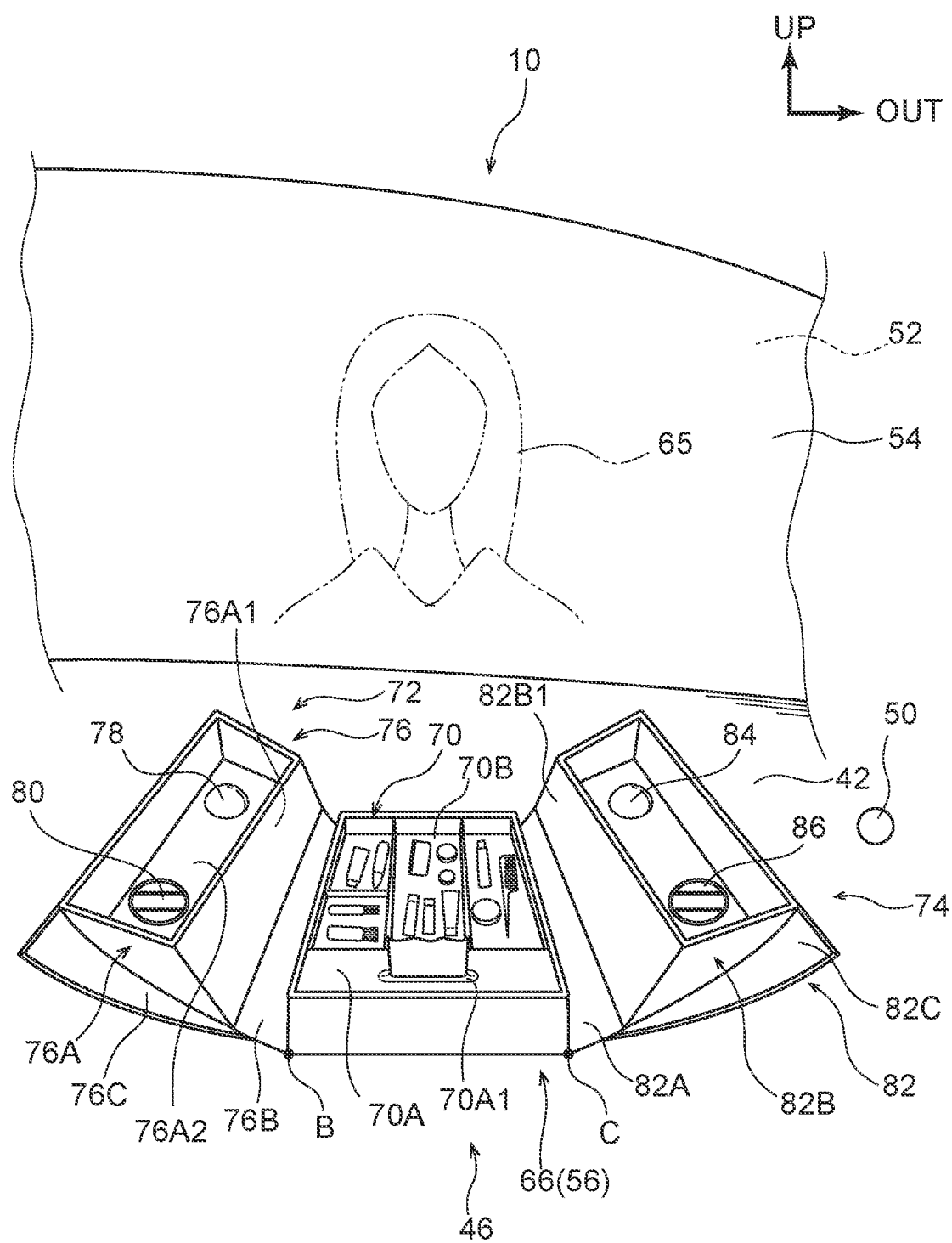
FIG. 1 illustrates a configuration of a vehicle cabin interior of a vehicle according to a first exemplary embodiment, in a state viewed by an occupant in a state in which a make-up mode has been activated.

As illustrated in FIG. 1 and FIG. 5, the make-up assistance device 46 includes a controller 48, a switch 50 serving as an activation section, a light-control film 52 serving as a shielding section, an organic EL display 54 serving as a display section, a make-up box 56, a seat actuator 58, a navigation device 60, a vehicle interior camera 62, and a vehicle exterior camera 64.

The controller 48 is configured including a non-illustrated onboard Electronic Control Unit (ECU), and as described later controls the various configuration elements of the make-up assistance device 46. The vehicle 10 is configured to be switched between an occupant-driven state and an autonomous driving state by the onboard ECU, and the onboard ECU performs various control of the vehicle 10 during autonomous driving of the vehicle 10.

Specifically, various sensors disposed in the vehicle 10 are electrically connected to the onboard ECU. The onboard ECU controls movement of the vehicle 10 by controlling the level of acceleration, the level of braking, the steering angle, and so on based on a situation surrounding the vehicle 10, as obtained via the sensors. Note that a non-illustrated input section, (switch) is electrically connected to the onboard ECU in the vehicle 10. Control to start or end autonomous driving can be performed by inputting various signals to the onboard ECU through the input section. In the present exemplary embodiment, the driving state of the vehicle 10 is monitored using the signals input to the onboard ECU through the input section.

The switch 50 is a push-button switch provided to the instrument panel 42. The switch 50 is electrically connected to the controller 48. When the switch 50 is pressed, a current flows in order to send a signal to the controller 48 so as to activate the make-up mode of the vehicle 10 and actuate the make-up assistance device 46. Note that the make-up mode is not activated in cases in which the vehicle 10 is in the occupant-driven state, even if the switch 50 is set to the current-flowing state.

The light-control film 52 is affixed spanning across the entire cabin 14 side face of the windshield glass 44. The transmissivity of the light-control film 52 can be adjusted by adjusting the magnitude of an applied voltage, based on control signals from the controller 48.

The organic EL display 54 is affixed spanning across the entire cabin 14 side face of the light-control film 52. The organic EL display 54 is transparent, and is configured to display various video images, driven by signals output from the controller 48.

The vehicle interior camera 62 is provided at a boundary between the windshield glass 44 and the roof 16, and is configured to acquire video images of the face of the occupant 24. Video image data acquired by the vehicle interior camera 62 is transmitted to the controller 48. The controller 48 detects the direction of the gaze of the occupant 24 from the video image data.

In the present exemplary embodiment, in a state in which the make-up mode has been activated, the light-control film 52 is controlled by the controller 48 and becomes opaque, such that the windshield glass 44 is shielded by the light-control film 52. As illustrated in FIG. 1, at this time a mirror image 63 of the face of the occupant 24 acquired by the vehicle interior camera 62 is displayed at the organic EL display 54.

However, as previously described, the windshield glass 44 is curved, and is at an angle with respect to the gaze of the occupant 24. Thus, if a video image of the face of the occupant 24 acquired by the vehicle interior camera 62 were to be displayed unaltered as a mirror image on the organic EL display 54, this mirror image would appear distorted to the occupant 24.

In the present exemplary embodiment, the mirror image 65 is adjusted based on the gaze direction of the occupant 24 detected by the controller 48, such that the mirror image 65 displayed as a mirror image including the entire face of the occupant 24 is displayed in front of the occupant 24 in an upright state relative to the occupant 24.

As illustrated in FIG. 1 and FIG. 3, the make-up box 56 includes a make-up box body 66 and a make-up box actuator 68 that displaces configuration components of the make-up box body 66. In a state in which the make-up mode has not been activated (a normal state), the make-up box body 66 is disposed at the vehicle upper side of the support section 40 and at the vehicle front of the front unit 36.

The make-up box body 66 is configured to be placed in a stowed mode and a deployed mode, and is configured including a main case 70 and side units 72, 74 that are configured to be displaced relative to the main case 70.

Specifically, in the state in which the make-up mode has not been activated, the make-up box body 66 is in the stowed mode (see FIG. 5). An outer profile of the make-up box body 66 in this state forms a substantially semicircular column shape with its length direction in the vehicle vertical direction, bulging toward the vehicle upper side and decreasing in diameter on progression, from the vehicle rear toward the vehicle front. In a state in which the make-up mode has been, activated, as described later, the make-up box actuator 68 causes the make-up box body 66 to transition from the stowed mode to the deployed mode (see FIG. 1).

The main case 70 is formed in a box shape open toward the vehicle upper side, and is formed in a rectangular shape with its length direction along the vehicle front-rear direction as viewed, along the vehicle vertical direction. A vehicle rear section (a section on the occupant 24 side) of the main case 70 configures a tissue box 70A. In a state in which the make-up box body 66 is in the deployed mode, the occupant 24 can pull tissues out through a tissue dispenser opening 70A1. A vehicle front section of the main case 70 configures an accessory case 70B, and make-up tools and so on are stored in this section. Note that an elasticated net or the like may be disposed at the vehicle upper side of the accessory case 70B in order to suppress the make-up tools and so on from flying out.

The side unit 72 includes a casing 76, a light 78 serving as an illumination section, and a drier 80. The casing 76 is configured including a body 76A that houses the light 78 and the drier 80, a first tab 76B extending from the body 76A toward the main case 70, and a second tab 76C extending from the body 76A toward the vehicle rear.

The body 76A is configured including a side wall 76A1 disposed with its plate thickness direction along the vehicle width direction in a state in which the make-up box body 66 is in the deployed mode, and an upper wall 76A2 disposed with its plate thickness direction along the vehicle vertical direction in a state in which the make-up box body 66 is in the deployed mode. A lens of the light 78 is in an exposed state at a vehicle front portion of the upper wall 76A2, and a duct of the drier 80 is attached to a vehicle rear portion of the upper wall 76A2.

A leading end of the first tab 76B of the casing 76 is coupled to the main case 70 through a non-illustrated shaft integrally provided to the first tab 76B, such that the casing 76 is configured to pivot about a pivot axis B extending along the length direction of the main case 70. In a state in which the make-up box body 66 is in the stowed mode, the first tab 76B abuts a peripheral wall of the main case 70, and a vehicle width direction inner (one vehicle width direction side) portion of the main case 70 is closed off from the vehicle upper side by the side wall 76A1 of the body 76A. Note that in a state in which the make-up box body 66 is in the stowed mode, the second tab 76C functions as a sun visor for the instrumentation unit 34

The light 78 is configured including a red light emitting diode, a green light emitting diode, and a blue light emitting diode, and is electrically connected to the controller 48. As described later, the color and brightness of the light 78 can be adjusted by the controller 48. In a state in which, the make-up box body 66 is in the deployed mode, the light 78 is disposed in a position configured to shine an illuminating light on the occupant 24.

The drier 80 is actuated by the occupant 24 operating a non-illustrated switch, enabling the occupant 24 to use the drier 80 as desired in a state in which the make-up mode has been activated. The drier 80 is electrically connected to the controller 48, such that a signal is sent from the drier 80 to the controller 48 in a state in which the drier 80 has been actuated. Namely, in the present, exemplary embodiment, actuation state of the drier 80 is monitored by the controller 48. Note that the duct of the drier 80 can be adjusted so as to blow an airflow from the drier 80 in a desired direction.

The side unit 74 is configured so as to be symmetrical to the side unit 72 about a line extending along the vehicle front-rear direction at the center of the main case 70. The side unit 74 includes a casing 82, a light 84 serving as an illumination section, and a drier 86.

A leading end of a first tab 82A of the casing 82 is configured to pivot about a pivot axis C extending along the length direction of the main case 70. In a state in which the make-up box body 66 is in the stowed mode, the first tab 82A abuts a peripheral wall of the main case 70, and a vehicle width direction outer (other vehicle width, direction, side) portion of the main case 70 is closed off from the vehicle upper side by a side wall 82B1 of a body 82B of the casing 82. Note that in a state in which the make-up box body 66 is in the stowed mode, a second tab 82C functions as a sun visor for the instrumentation unit 34.

The make-up box actuator 68 is configured including a non-illustrated slider; a non-illustrated first pivot actuator, and a non-illustrated second pivot actuator, each electrically connected to the controller 48 and controlled by the controller 48. As illustrated in FIG. 2, the slider couples a lower face of the main case 70 to the top plate of the support section 40. When actuated, the slider is configured to move the main case 70, and therefore the make-up box body 66, in the vehicle front-rear direction.

As illustrated in FIG. 1, when actuated, the first pivot actuator is configured to rotate the shaft coupling the side unit 72 to the main case 70 together with a non-illustrated gear provided to the shaft so as to pivot the side unit 72 about the pivot axis B. The second pivot actuator has basically the same configuration as the first pivot actuator, and is configured to pivot the side unit 74 about the pivot axis C when actuated.

The make-up box actuator 68 configured as described above is actuated by a control signal from the controller 48 in a state in which the make-up mode has been activated, such that the make-up box body 66 transitions from the stowed mode to the deployed mode. Specifically, in a state in which the make-up mode has been activated, the make-up box actuator 68 moves the make-up box body 66 toward the vehicle rear and deploys the side units 72, 74 with respect to the main case 70. In a state in which the make-up mode is ended, the make-up box actuator 68 is actuated by a control signal from the controller 48, such that the make-up box body 66 transitions from the deployed mode to the stowed mode.

Returning to FIG. 5, the seat actuator 58 is configured including a casing 88, and a seatback pivoting section 90 and a slider 92 that are electrically connected to the controller 48. The casing 88 is configured including a seat cushion support section 88A that is disposed at the vehicle lower side of the seat cushion 26 and supports the seat cushion 26, and a seatback support section 88B in which the seatback pivoting section 90 is housed and that supports the lower end of the seatback 28 through, the seatback pivoting section 90.

The seatback pivoting section 90 is configured including a motor and the like. The seatback pivoting section 90 is driven by a control signal from the controller 48 so as to be configured to pivot the seatback 28 about a pivot axis D extending along the seat width direction so as to adjust a tilt angle of the seatback 28 with respect to the seat cushion 26. Namely, the controller 48 also functions as a seatback pivot control section. The seatback pivoting section 90 is actuated by a control signal from the controller 48 in a state in which the make-up mode has been activated, so as to pivot the seatback 28 such that the seatback 28 adopts an erect state with respect to the seat cushion 26.

The slider 92 is interposed between the seat cushion support section 88A and the floor panel 20, and is configured to move the casing 88 and the seat 22 along the vehicle front-rear direction when actuated by a control signal from the controller 48. The slider 92 is actuated by a control signal from the controller 48 in a state in which the make-up mode has been activated, so as to move the seat 22 toward the vehicle rear to a position where the front unit 36 does not hit the legs of the occupant 24 as it pivots.

Returning to FIG. 3, the navigation device 60 includes a non-illustrated Global Positioning System (GPS) device, a non-illustrated storage medium such as a hard disk, and a non-illustrated display device disposed inside the cabin 14. The GPS device is configured to identify the position of the vehicle 10 by computing the position of the vehicle 10 from GPS signals received from plural GPS satellites 94. Map information and so on is stored in the storage medium. The navigation device 60 references this map information against the current position of the vehicle 10 as identified by the GPS device in order to detect the current position of the vehicle 10 with a high degree of precision.

The navigation, device 60 is configured to set a travel route to a destination set by the occupant 24 based on the current position of the vehicle 10 and the map information stored in the storage medium. The navigation device 60 and the controller 48 are electrically connected to each other, and the destination of the vehicle 10 and an expected time of arrival at the destination (estimated destination arrival time) are temporarily stored in a non-illustrated storage medium of the controller 48. Namely, the controller 48 also functions as a destination acquisition section.

Returning to FIG. 5, the vehicle exterior camera 64 is provided to a vehicle front peripheral edge of the roof 16, and is configured to acquire video images of the scene ahead of the vehicle. Note that although the vehicle exterior camera 64 is illustrated as if disposed at the vehicle upper side of the roof 16 in FIG. 5 in order to facilitate understanding of the configuration, the vehicle exterior camera 64 is actually embedded in the roof 16 such that only a lens of the vehicle exterior camera 64 is exposed through the roof 16. Video image data acquired by the vehicle exterior camera 64 is transmitted to the controller 48.

Note that in the present exemplary embodiment, the illuminating light from the lights 78, 84 can be adjusted by the controller 48 based on the destination of the vehicle 10 and video images acquired by the vehicle exterior camera 64. Namely, the controller 48 also functions as an illumination adjustment section. The controller 48 is also configured to change a travel route to the destination based on video images of the face of the occupant 24 acquired by the vehicle interior camera 62.

Specifically, in cases in which the destination of the vehicle 10 stored in the controller 48 is a location with relatively dim Interior lighting, such as an art gallery, the lights 78, 84 are adjusted by the controller 48 such that a weak illuminating light is shone. In cases in which the destination of the vehicle 10 stored in the controller 48 is an outdoor location, such as an amusement park, the brightness outside the vehicle is detected using the video image data acquired by the vehicle exterior camera 64, and the lights 78, 84 are adjusted such that illuminating light is shone with a brightness similar to the brightness outside the vehicle.

In the present exemplary embodiment, images captured at specific intervals between the occupant 24 starting to do their make-up and the occupant 24 finishing their make-up are stored in the storage medium of the controller 48. The controller 48 compares video images of the face of the occupant 24 acquired by the vehicle interior camera 62 against video images of the occupant 24 doing their make-tip stored in the storage medium, so as to predict an estimated make-up completion time.

The controller 48 also compares the estimated make-up completion time against the estimated destination arrival time. In cases in which the controller 48 determines that the occupant 24 will not finish doing their make-up before the vehicle 10 arrives at the destination, the travel route (route) to the destination is re-set by the navigation device 60 in order to arrive at the destination at the estimated make-up completion time.

Operation and Advantageous Effects of Present Exemplary Embodiment

Explanation follows regarding operation and advantageous effects of the present exemplary embodiment.

Figure 4:
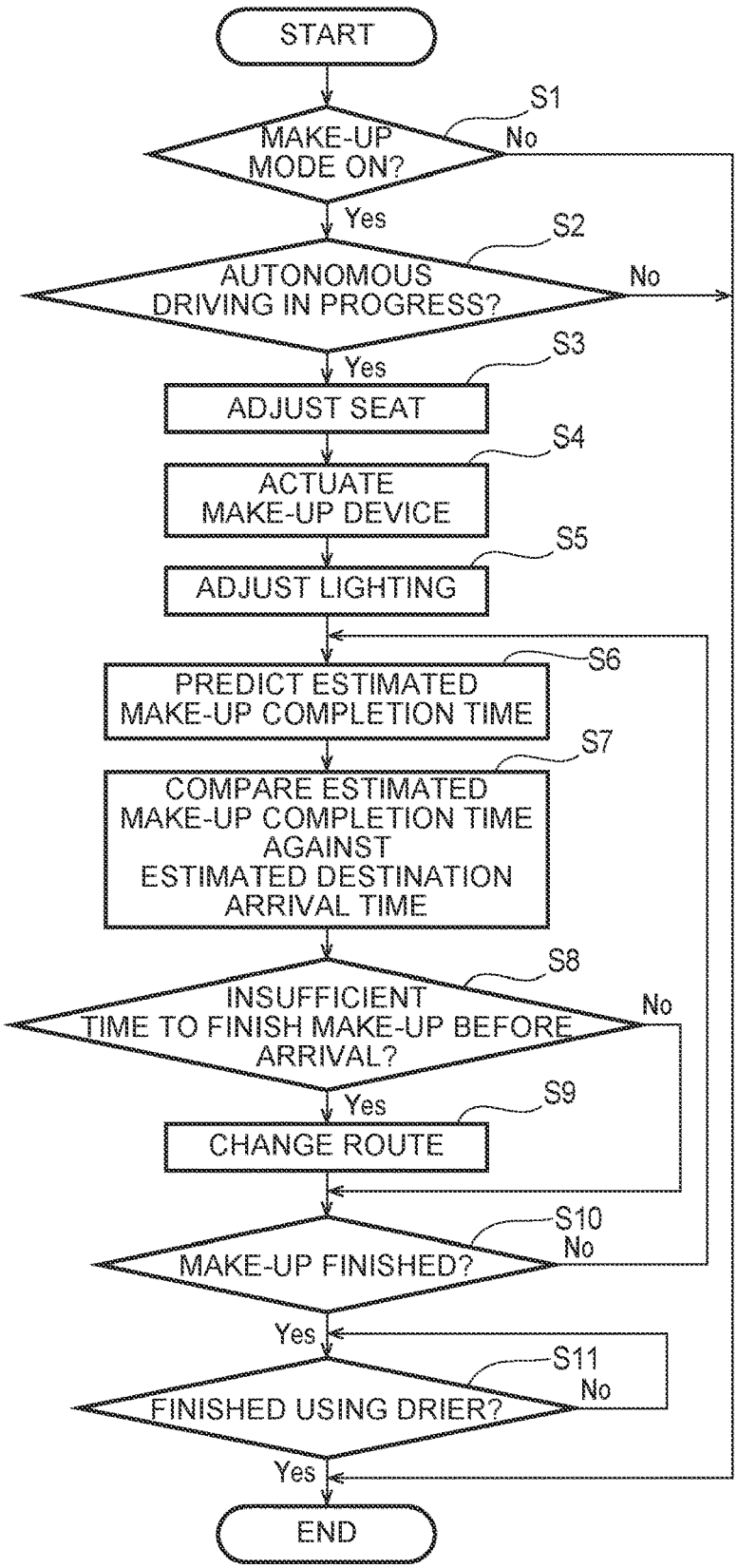
FIG. 4 is a flow chart illustrating an example of processing performed by a controller configuring a make-up assistance device according to the first exemplary embodiment.

First, explanation follows regarding an example of a control flow of the make-up assistance device 46 by the controller 48, with reference to FIG. 4.

When the control flow is started, at step S1, determination is made as to whether or not the make-up mode has been activated based on the presence or otherwise of a signal from the switch 50. In cases in which the controller 48 determines that the make-up mode has not been activated, the control flow ends. In cases in which the make-up mode is determined to have been activated, processing proceeds to step S2.

At step S2, determination is made as to whether or not the driving state of the vehicle 10 is autonomous driving based on a signal input through the input section connected to the onboard ECU of the controller 48. In cases in which the controller 48 determines that the driving state of the vehicle 10 is not autonomous driving, the control flow ends. In cases in which the driving state of the vehicle 10 is determined to be autonomous driving, processing proceeds to step S3.

At step S3, the seat actuator 58 is actuated such that the seat 22 is moved toward the vehicle rear to a position where the front unit 36 does not hit the legs of the occupant 24 as it pivots, and the seatback 28 is pivoted to an erect state with respect to the seat cushion 26. After the seat actuator 58 has been actuated, processing proceeds to step S4.

At step S4, the make-up box actuator 68 is actuated such that the make-up box body 66 transitions from the stowed mode to the deployed mode. After the make-up box body 66 has transitioned, processing proceeds to step S5.

At step S5, the illuminating light from the lights 78, 84 is adjusted based on the destination stored in the controller 48 and the video images acquired by the vehicle exterior camera 64. After the lights 78, 84 have been adjusted, processing proceeds to step S6.

At step S6, a video image of the face of the occupant 24 acquired by the vehicle interior camera 62 is compared against a video image of the occupant 24 while doing their make-up stored in the storage medium of the controller 48 in order to predict the estimated make-up completion time. After the estimated make-up completion time has been predicted, processing proceeds to step S7.

At step S7, the estimated make-up completion time predicted at step S7 is compared against the estimated destination arrival time stored in the storage medium of the controller 48. After the estimated make-up completion time and the estimated, destination arrival time have been compared, processing proceeds to step S8.

At step S8, determination is made as to whether or not the occupant 24 will be able to finish doing their make-up prior to the vehicle 10 arriving at the destination, based on the comparison results of step S7. In cases in which determination is made that the occupant 24 will not be able to finish doing their make-up prior to the vehicle 10 arriving at the destination, processing proceeds to step S9. In cases in which determination is made that the occupant 24 will be able to finish doing their make-up prior to the vehicle 10 arriving at the destination, processing proceeds to step S10.

At step S9, the travel route to the destination is re-set by the navigation device 60 such that the estimated make-up completion time and the estimated destination arrival time are the same. After the travel route of the vehicle 10 has been set, processing proceeds to step S10.

At step S10, a video image of the face of the occupant 24 acquired by the vehicle interior camera 62 is compared against a video image of the occupant 24 with completed make-up stored in the storage medium of the controller 48 to determine whether or not the occupant 24 has finished doing their make-up. In cases in which determination is made that the occupant 24 has finished doing their make-up, processing proceeds to step S11. In cases in which determination is made that the occupant 24 has not finished doing their make-up, processing returns to step S6.

At step S11, determination is made as to whether or not the occupant 24 is using the driers 80, 86 based on signals from the driers 80, 86. In cases in which determination is made that the occupant 24 has finished using the driers 80, 86, the front unit 36 and the seat 22 return to the state prior to the make-up mode being activated, and the control flow ends. In cases in which determination is made that the occupant 24 has net finished using the driers 80, 86, the processing of step S11 is repeated. Note that processing transitions from step S10 to step S11 after a fixed duration (approximately 19 to 60 seconds) has elapsed since the end of step S10. Note that the occupant 24 may forcibly end the control flow by pressing the switch 50 in a state in which the make-up mode has been activated.

In the present exemplary embodiment as illustrated in FIG. 1, in a state in which the make-up mode has been activated, the windshield glass 44 is made opaque by the light-control film 52. This enables the occupant 24 to do their make-up in a state hidden from the gaze of passers-by and so on outside the vehicle by the light-control film 52 in a state in which the make-up mode has been activated.

In the present exemplary embodiment, in a state in which the make-up mode has been activated, the organic EL display 54 is used to display the mirror image 65 of the entire face of the occupant 24 in front of the occupant 24 in an upright state relative to the occupant 24. This enables a state to be achieved that is similar to a state that would be achieved by disposing a mirror configured to reflect the entire face of the occupant 24 in front of the occupant 24 while the occupant 24 is doing their make-up. Thus, the present exemplary embodiment enables the occupant 24 to see their entire face while doing their make-up, while securing the privacy of the occupant 24.

In the present exemplary embodiment, the face of the occupant 24 is illuminated by the illuminating light shone from the lights 78, 84 in a state in which the make-up mode has been activated. This enables the mirror image 65 of the face of the occupant 24 to be clearly displayed on the organic EL display 54, even in cases in which the vehicle interior 12 is dark. Thus, the present exemplary embodiment enables the brightness inside the vehicle interior 12 to be suppressed from having an effect on the make-up of the occupant 24.

In the present exemplary embodiment, the destination of the vehicle 10 is acquired by the controller 48. The illuminating light shone from the lights 78, 84 is adjusted by the controller 48 based on the destination acquired by the controller 48. For example, in cases in which the destination is a location with relatively dim interior lighting, such as an art gallery, adjustment is made by the controller 48 such that a weak illuminating light is shone. The present exemplary embodiment thereby enables the strength of the illuminating light shone on the face of the occupant 24 to be made to correspond to the lighting at their destination. Thus, the present exemplary embodiment enables make-up to be applied under similar lighting conditions to those at the destination of the vehicle 10.

In the present exemplary embodiment, as illustrated in FIG. 5, the seatback 28 of the seat 22 on which the occupant 24 sits is configured to be pivoted by the seatback pivoting section 90. In a state in which the make-up mode has been activated, the seatback 28 is set to an erect state with respect to the seat cushion 26 by driving the seatback pivoting section 90 using the controller 48. Thus, even if the back of the occupant 24 leaning on the seatback 28 is tilted with respect to the seat cushion 26 prior to the make-up mode being activated, the back of the occupant 24 can be placed in an erect state with respect to the seat cushion 26 after the make-up mode has been activated. Thus, the present exemplary embodiment enables the occupant 24 to be assisted its easily maintaining a posture suitable for doing their make-up.

In addition thereto, in the present exemplary embodiment, the windshield glass 44 is made opaque by the light-control film 52 provided along the windshield glass 44 in a state in which the make-up mode has been activated. This enables gazes and light from in front of the vehicle be shielded in a state in which the make-up mode has been activated.

Moreover, the organic EL display 54 is disposed at the vehicle interior 12 side of the light-control film 52, and the organic EL display 54 is provided along a vehicle interior 12 side face of the windshield glass 44. In a state in which the make-up mode has been activated, the organic EL display 54 is used to display the mirror image 65 of the entire face of the occupant 24 in front of the occupant 24 in an upright state relative to the occupant 24. This enables the occupant 24 to use the windshield glass 44 as a mirror while doing their make-up. Thus, in the present exemplary embodiment, configuration inside the vehicle interior 12 can be simplified compared to a configuration in which, for example, a separate mirror or head-up display for reflecting the face of the occupant 24 is provided in front of the occupant 24.

Second Exemplary Embodiment

Figure 6:
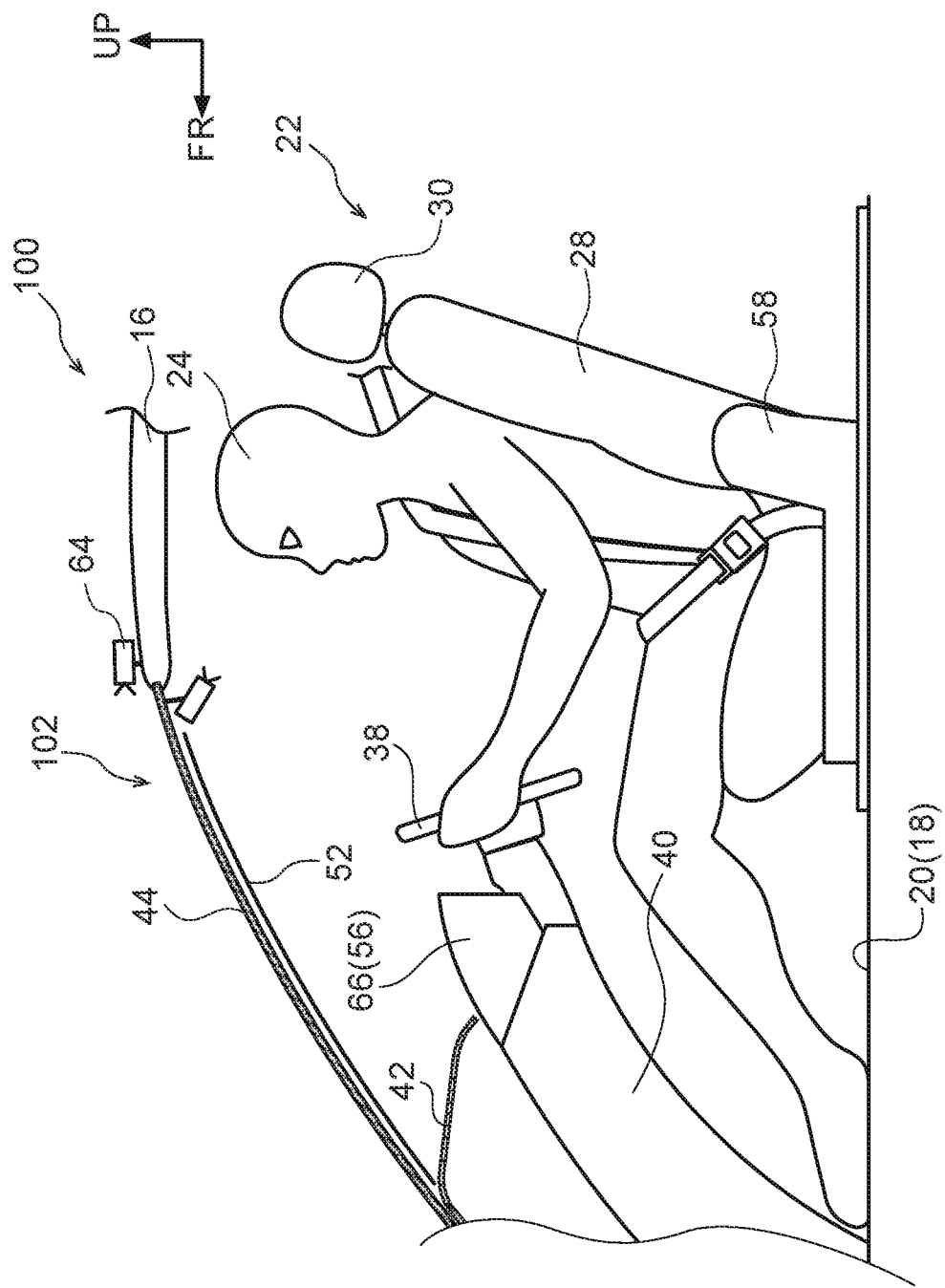
FIG. 6 is a side view schematically illustrating a configuration of a vehicle according to a second exemplary embodiment.
Figure 7:
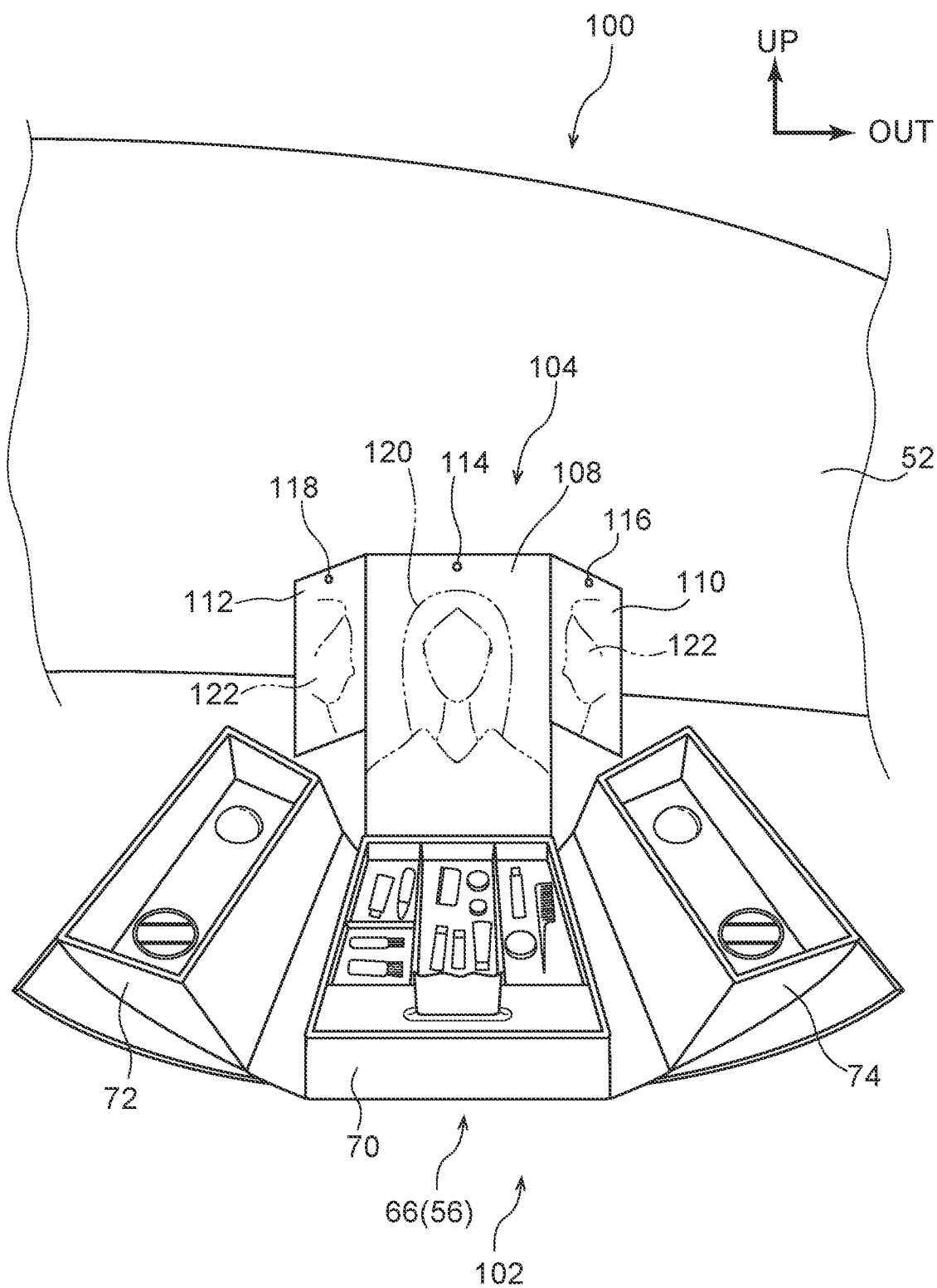
FIG. 7 illustrates a configuration of a vehicle cabin interior of a vehicle according to the second exemplary embodiment, in a state viewed by an occupant in a state in which a make-up mode has been activated.
Figure 8:
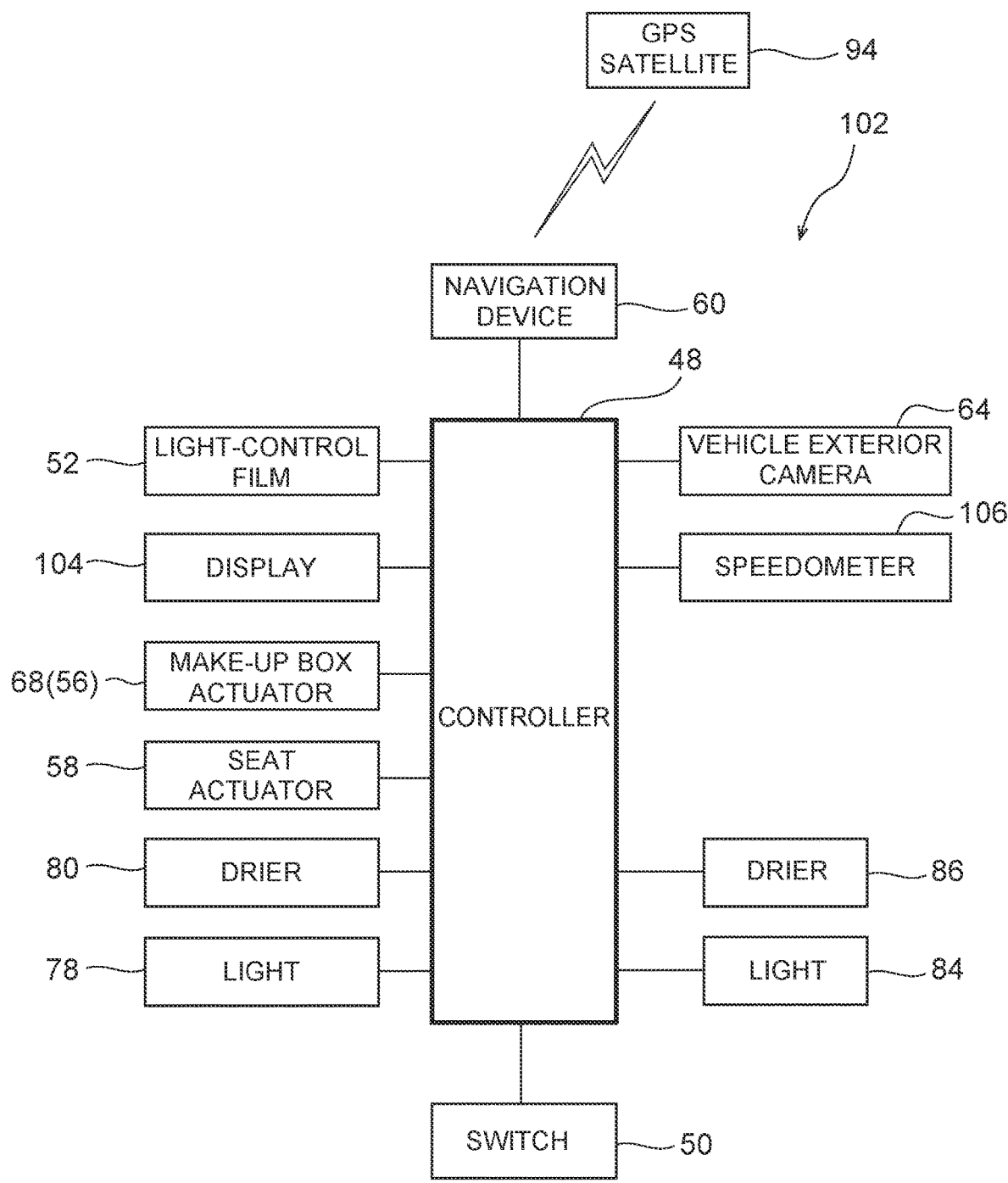
FIG. 8 is a block diagram illustrating an outline configuration of a make-up assistance device according to the second exemplary embodiment.

Explanation follows regarding a second exemplary embodiment of a vehicle according to the present disclosure, with reference to FIG. 6 to FIG. 8. Note that configuration portions similar to those in the first exemplary embodiment described above are appended with the same reference numerals, and explanation thereof is omitted.

A vehicle 100 according to the present exemplary embodiment has basically the same configuration as the vehicle 100 according to the first exemplary embodiment. However, in the present exemplary embodiment, as illustrated in FIG. 8, a make-up assistance device 102 differs from that of the first exemplary embodiment in that it does not include a vehicle interior camera 62 or an organic EL display 54, but instead includes a display 104 serving as a display section, this being a first feature of the present exemplary embodiment. Moreover, the make-up assistance device 102 is configured including a speedometer 106, this being a second feature.

Specifically, as illustrated in FIG. 7 the display 104 is configured including a main display section 108 configuring a main section of the display 104, a side display section 110 disposed at the vehicle width direction outer side of the main display section 108, and a side display section 112 disposed at the vehicle width direction inner side of the main display section 108. A lower end of the display 104 is attached to a vehicle front peripheral edge of the main case 70 so as to be configured to pivot with respect to the main case 70.

In a state in which the make-up mode has not been activated, the display 104 is in a state in which the side display sections 110, 112 have been folded in toward the main display section 108 and the main case 70 is closed off from the vehicle upper side. Namely, the display 104 is in a state stowed inside the make-up box body 66 in a state in which the make-up box body 66 is in the stowed mode.

The display 104 includes a non-illustrated actuator, and in a slate in which the make-up mode is activated, the actuator is actuated such that the display 104 and the make-up box body 66 are both deployed at the same time.

A camera 114 is provided at an upper end of a display screen of the main display section 108, a camera 116 is provided at an upper end of a display screen of the side display section 110, and a camera 118 is provided at an upper end of a display screen of the side display section 112. Video images captured by the camera 114 are displayed on the display screen of the main display section 108, video images captured by the camera 116 are displayed on the side display section 110, and video images captured by the camera 118 are displayed on the side display section 112.

In the deployed state, the display 104 configured as described above is disposed such that the main display section 108 is an upright state in the vehicle vertical direction. A mirror image 120 of the entire face of the occupant 24 is displayed on the main display section 108 in an upright state relative to the occupant 24. Mirror images 122 of side profiles of the face of the occupant 24 are displayed on the side display sections 110, 112.

As illustrated in FIG. 8, the speedometer 106 is electrically connected to the controller 48, and a signal indicating the speed of the vehicle 100 is transmitted from the speedometer 106 to the controller 48.

In the present exemplary embodiment, in a state in which the make-up mode has been activated, the controller 48 adjusts the voltage applied to the light-control film 52 based on the signal indicating the speed of the vehicle 100 transmitted by the speedometer 106. In other words, in a state in which the make-up mode has been activated, the speed of the vehicle 100 and the transmissivity of the light-control film 52 are correlated with each other. In the present exemplary embodiment, the controller 48 adjusts the transmissivity of the light-control film 52 so as to be lowered as the speed of the vehicle 100 decreases and raised as the speed of the vehicle 100 increases.

Specifically, in a state in which the speed of the vehicle 100 is from 0 km/h to 20 km/h, the transmissivity of the light-control film 52 is set to 0%, and in a state in which the speed is 60 km/h or greater, the transmissivity of the light-control film 52 is set to 100%. In a state in which the speed of the vehicle 100 is from 20 km/h to 60 km/h, the transmissivity of the light-control film 52 is set so as to be proportionate to the speed of the vehicle 100.

Such a configuration exhibits similar operation and advantageous effects to those in the first exemplary embodiment described above, with the exception of operation and advantageous effects exhibited by the organic EL display 54.

In addition thereto, in the present exemplary embodiment, in a state in which the make-up mode has been activated, the display 104 is deployed in front of the occupant 24 and a mirror image of the entire face of the occupant 24 is displayed on the display 104 in an upright state relative to the occupant 24. This enables the occupant 24 to use the display 104 as a mirror while doing their make-up.

In the present exemplary embodiment, the light-control film 52 is provided along the windshield glass 44, and in a state in which the make-up mode has been activated, the transmissivity of the light-control film 52 is lowered as the speed of the vehicle 100 decreases and raised as the speed of the vehicle 100 increases. This enables the occupant 24 to do their make-up in a state hidden from the gaze of passers-by and so on outside the vehicle by the light-control film 52 in a state in which the vehicle 100 is traveling at low speed, namely, in a state in which the vehicle interior 12 can easily be seen from outside the vehicle. This also enables the occupant 24 to do their make-up in a state in which, the occupant 24 is able to ascertain conditions outside the vehicle interior 12 in a state in which the vehicle 100 is traveling at high speed, namely, in a state in which the vehicle interior 12 is difficult to see from outside the vehicle. Thus, in a state in which the occupant 24 is doing their make-up, the present exemplary embodiment enables the privacy of the occupant 24 to be secured in a state in which the vehicle 100 is moving at low speed, and enables the occupant 24 to easily ascertain the situation surrounding the vehicle 100 in a state in which the vehicle 100 is moving at high speed.

Additional Explanation of Above Exemplary Embodiments (1) In the exemplary embodiments described above, the make-up assistance device 46, 102 is provided for an occupant 24 seated in the driving seat; however, the make-up assistance device 46, 102 may be provided for an occupant seated in a front passenger seat. The make-up assistance device 46, 102 may alternatively be configured for an occupant seated in the driving seat of a left-hand drive vehicle.

(2) Although the make-up assistance device 46, 102 includes the make-up box 56 in the above exemplary embodiments, there is no limitation thereto. For example, a vehicle may be provided with a make-up assistance device for an occupant seated in a rear passenger seat, the make-up assistance device being provided with a light-control film and an organic EL display on a side window glass or a rear glass, but not including the make-up box 56. Such a configuration may also be configured such that a seat actuator is provided to the rear passenger seat, enabling the seat to be moved such that the side window glass or rear glass is positioned in front of the occupant.

(3) In the above exemplary embodiments, a mirror image of the occupant 24 is displayed in front of the occupant 24 in a state in which the make-up mode has been activated; however, configuration may be such that the speed of the vehicle 10 or the like is displayed in front of the occupant 24 together with the mirror image.

What is claimed is:

1. A vehicle, comprising:
an activation section used by an occupant to activate a make-up mode to assist the occupant in doing their make-up;
a shielding section that makes opaque at least one of a windshield glass, a side window glass, or a rear glass in a state in which the make-up mode has been activated;
a display section that is configured to display a mirror image of an entire face of the occupant in front of the occupant in a state in which the make-up mode has been activated, the mirror image being in an upright state relative to the occupant, an area of the display section that displays the mirror image of the entire face of the occupant in the state in which the make-up mode has been activated is configured to be transparent in a state without displaying.

2. The vehicle of claim 1, further comprising an illumination section that shines an illuminating light on the occupant in a state in which the make-up mode has been activated.

3. The vehicle of claim 2, further comprising:
a destination acquisition section that acquires a destination of the vehicle; and
an illumination adjustment section that adjusts the illuminating light based on the destination acquired by the destination acquisition section, in a state in which the make-up mode has been activated.

4. The vehicle of claim 1, further comprising:
a seatback pivoting section that is configured to pivot a seatback of a seat in which the occupant sits; and
a seatback pivot control section that drives the seatback pivoting section such that the seatback attains an upright state relative to a seat cushion of the seat, in a state in which the make-up mode has been activated.

5. The vehicle of claim 1, wherein:
the shielding section is a light-control film that is provided along the windshield glass; and
the display section is an organic EL display that is disposed at a vehicle cabin inner side of the light-control film and that is provided along a vehicle cabin inner side face of the windshield glass.

6. The vehicle claim 1, wherein:
the shielding section is a light-control film that is provided along the windshield glass and that is configured to be adjusted such that transmissivity of the light-control film is lowered as a speed of the vehicle decreases and transmissivity of the light-control film is raised as the speed of the vehicle increases; and
the display section is a display that is deployed in front of the occupant in a state in which the make-up mode has been activated.

7. The vehicle of claim 1, further comprising a camera, wherein the mirror image of the entire face of the occupant that is displayed by the display section is acquired by the camera.

8. A vehicle, comprising:
an activation section used by an occupant to activate a make-up mode to assist the occupant in doing their make-up;
a shielding section that makes opaque at least one of a windshield glass, a side window glass, or a rear glass in a state in which the make-up mode has been activated;
a display section that is configured to display a mirror image of an entire face of the occupant in front of the occupant in a state in which the make-up mode has been activated, the mirror image being in an upright state relative to the occupant;
an illumination section that shines an illuminating light on the occupant in a state in which the make-up mode has been activated;
a destination acquisition section that acquires a destination of the vehicle; and
an illumination adjustment section that adjusts the illuminating light based on the destination acquired by the destination acquisition section, in a state in which the make-up mode has been activated.

9. The vehicle of claim 8, further comprising:
a seatback pivoting section that is configured to pivot a seatback of a seat in which the occupant sits; and
a seatback pivot control section that drives the seatback pivoting section such that the seatback attains an upright state relative to a seat cushion of the seat, in a state in which the make-up mode has been activated.

10. The vehicle of claim 8, wherein:
the shielding section is a light-control film that is provided along the windshield glass; and
the display section is an organic EL display that is disposed at a vehicle cabin inner side of the light-control film and that is provided along a vehicle cabin inner side face of the windshield glass.

11. The vehicle claim 8, wherein:
the shielding section is a light-control film that is provided along the windshield glass and that is configured to be adjusted such that transmissivity of the light-control film is lowered as a speed of the vehicle decreases and transmissivity of the light-control film is raised as the speed of the vehicle increases; and
the display section is a display that is deployed in front of the occupant in a state in which the make-up mode has been activated.

12. A vehicle, comprising:
an activation section used by an occupant to activate a make-up mode to assist the occupant in doing their make-up;
a shielding section that makes opaque at least one of a windshield glass, a side window glass, or a rear glass in a state in which the make-up mode has been activated;

a display section that is configured to display a mirror image of an entire face of the occupant in front of the occupant in a state in which the make-up mode has been activated, the mirror image being in an upright state relative to the occupant;

a seatback pivoting section that is configured to pivot a seatback of a seat in which the occupant sits; and a seatback pivot control section that drives the seatback pivoting section such that the seatback attains an upright state relative to a seat cushion of the seat, in a state in which the make-up mode has been activated.

13. The vehicle of claim 12, further comprising an illumination section that shines an illuminating light on the occupant in a state in which the make-up mode has been activated.

14. The vehicle of claim 12, wherein:

the shielding section is a light-control film that is provided along the windshield glass; and the display section is an organic EL display that is disposed at a vehicle cabin inner side of the light-control film and that is provided along a vehicle cabin inner side face of the windshield glass.

15. The vehicle claim 12, wherein:

the shielding section is a light-control film that is provided along the windshield glass and that is configured to be adjusted such that transmissivity of the light-control film is lowered as a speed of the vehicle decreases and transmissivity of the light-control film is raised as the speed of the vehicle increases; and the display section is a display that is deployed in front of the occupant in a state in which the make-up mode has been activated.

* * * * *

UNITED STATES PATENT AND TRADEMARK OFFICE
CERTIFICATE OF CORRECTION

PATENT NO. : 10,974,651 B2
APPLICATION NO. : 16/254050
DATED : April 13, 2021
INVENTOR(S) : Akira Sasaki et al.

It is certified that error appears in the above-identified patent and that said Letters Patent is hereby corrected as shown below:

In the Specification

In Column 1, Line(s) 8, after "filed", delete ",".

In Column 2, Line(s) 27, after "destination", delete ",".

In Column 3, Line(s) 35, delete "white" and insert --while--, therefor.

In Column 3, Line(s) 50, after "which", delete ",".

In Column 6, Line(s) 18, after "later", insert --,--.

In Column 6, Line(s) 30, after "section", delete ",".

In Column 6, Line(s) 58, delete "race" and insert --face--, therefor.

In Column 6, Line(s) 67, after "time", insert --,--.

In Column 7, Line(s) 1, delete "63" and insert --65--, therefor.

In Column 7, Line(s) 36, after "progression", delete ",".

In Column 7, Line(s) 38, after "been", delete ",".

In Column 7, Line(s) 44, after "viewed", delete ",".

In Column 8, Line(s) 16, after "34", insert --.--.

In Column 8, Line(s) 21, after "which", delete ",".

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,974,651 B2

In Column 8, Line(s) 31, after "present", delete ",".

In Column 8, Line(s) 32, before "actuation", insert --an--.

In Column 8, Line(s) 45, delete "width, direction," and insert --width direction--, therefor.

In Column 8, Line(s) 52, after "slider", delete ";" and insert --,--, therefor.

In Column 9, Line(s) 22, after "through", delete ",".

In Column 9, Line(s) 56, after "navigation", delete ",".

In Column 10, Line(s) 36 & 37, delete "make-tip" and insert --make-up--, therefor.

In Column 10, Line(s) 37, after "medium", delete ",".

In Column 11, Line(s) 31, after "estimated", delete ",".

In Column 12, Line(s) 1, delete "19" and insert --10--, therefor.

In Column 12, Line(s) 59, delete "its" and insert --in--, therefor.

In Column 13, Line(s) 36, after "FIG. 7", insert --,--.

In Column 13, Line(s) 53, delete "slate" and insert --state--, therefor.

In Column 14, Line(s) 50, after "which", delete ",".